United States Patent [19]

Reimer

[11] Patent Number: 4,618,113
[45] Date of Patent: Oct. 21, 1986

[54] CABLE CLAMP

[75] Inventor: William A. Reimer, Wheaton, Ill.

[73] Assignee: GTE Communication Systems Corp., Northlake, Ill.

[21] Appl. No.: 776,190

[22] Filed: Sep. 13, 1985

[51] Int. Cl.⁴ .............................................. F16L 5/00
[52] U.S. Cl. .................................... 248/56; 248/68.1; 248/73
[58] Field of Search ................... 248/56, 57, 68.1, 49, 248/73, 65.7, 71; 174/153 R, 157

[56] References Cited

U.S. PATENT DOCUMENTS

| | | | |
|---|---|---|---|
| 2,650,948 | 9/1953 | Findlay | 248/68.1 X |
| 2,732,226 | 1/1956 | Brattberg | 248/56 X |
| 3,742,119 | 6/1973 | Newman | 248/68.1 X |
| 3,920,887 | 11/1975 | Kloos et al. | 248/68.1 X |
| 4,194,712 | 3/1980 | Elvegaard | 248/68.1 |
| 4,347,998 | 9/1982 | Loree | 248/68.1 |

Primary Examiner—Ramon S. Britts
Assistant Examiner—Karen J. Chotkowski
Attorney, Agent, or Firm—Robert J. Black

[57] ABSTRACT

A clamp for cables passing through a panel near an edge thereof including an anvil, a clamping pad and a latch member all positioned on a slideable basis within a slot extending from an edge of the panel inward a predetermined distance. Slots in the anvil interferingly engage and hold cables therein to facilitate assembly of the clamp. Fingers extending from arms of the latch member engage catches in side edges of the slot to lock the latch member in compressive engagement with the pad thereby clamping the cables between the anvil and the pad.

13 Claims, 1 Drawing Figure

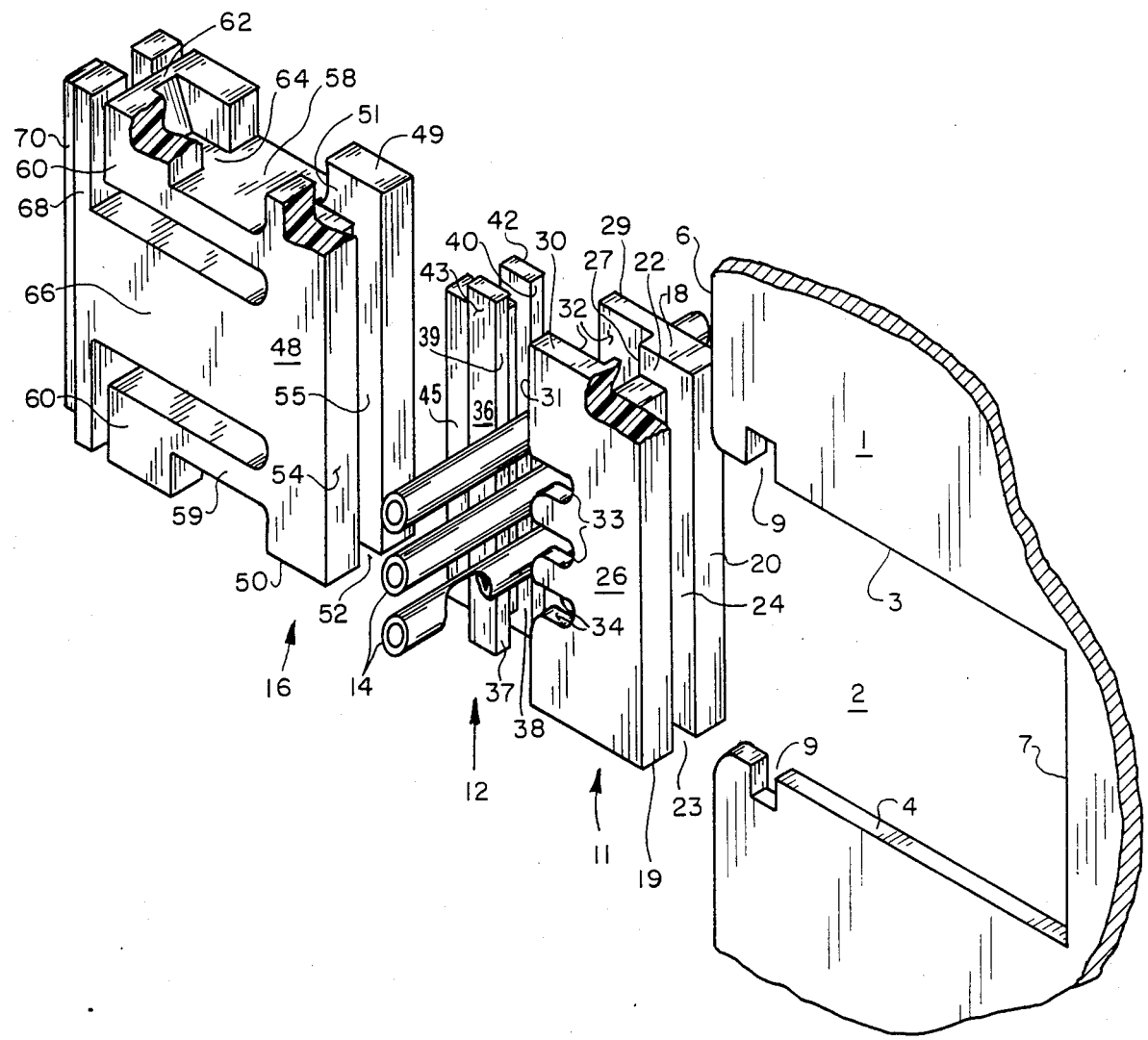

CABLE CLAMP

BACKGROUND OF THE INVENTION (1) Field of the Invention

The present invention relates to cable clamps and, more particularly, to a clamp for use with a cable passing through a planar surface or panel.

(2) Background Art

Cable clamps are very well known to those skilled in art. In this regard, U.S. Pat. No. 4,480,808 teaches a cable clamp comprised of two identical clamp members, each clamp member adapted to mount within a keyhole shaped slot within a panel and adapted to lockingly engage each other clamping a cable therebetween.

Additionally, appliance cord strain reliefs are known which affix a power cord supplying electrical power to a device such as a household appliance, to the device enclosure at the point the cord passes through the enclosure wall.

The above devices while operating generally satisfactorily do not permit a cable to be mounted passing through an enclosure wall near an edge thereof in the manner set forth by the present invention.

SUMMARY OF THE INVENTION

The present invention provides a cable clamp for restraining a cable passing through a planar surface or panel near an edge thereof and provides the restraint at that location. The cable clamp of the present invention includes a slot in the planar surface or panel extending from an edge thereof inwardly a fixed distance and ending in an inner edge, a clamp anvil positioned in the slot by means of grooves formed in opposite side edges, at least one cable is positioned in contact with the anvil within the slot, a clamping pad positioned within the slot also by means of grooves in opposite side edges and a latch member also similarly positioned within the groove. The latch member engages the slot to exert a force on the pad and clamp the cable between the pad and the anvil.

BRIEF DESCRIPTION OF THE DRAWING

An understanding of the present invention will be apparent from the following description taken in conjunction with the accompanying drawing, representing a perspective view of the present invention.

DESCRIPTION OF THE PREFERRED EMBODIMENT

Referring now to the drawing, there is shown a cable clamp in accordance with the present invention including a planar surface or panel 1 in which is formed a slot 2 including a first and second parallel side edge, 3 and 4 respectively, both slot side edges extending from an edge 6 of the panel 1 inward to and perpendicular to an inner edge 7 of the slot 2. A pair of catches 9 are formed in each of the slot side edges 3 and 4 a fixed distance from the slot inner edge 7.

Positioned within the slot 2 are a clamping anvil 11 and a clamping pad 12 between which are positioned one or more cables 14. The cables 14 may have a fixed diameter and may be of the nondeformable variety, for example optical fiber cable, or may be of the deformable variety, for example metallic conductor cable. Finally, a latch member 16 is positioned within a panel slot 2.

The anvil 11 in the present embodiment is of resilient construction and includes a first side edge 18, a second side edge 19 and an inner edge 20. A groove 22 may be formed in the first side edge 18 of the anvil 11 in alignment with the first side edge 3 of the slot 2 and wide enough to accept the first side edge 3 therein. Similarly, the second side edge 19 of the anvil 11 may include a second groove (not shown) formed therein in alignment with the second side edge 4 of the slot 2 and wide enough to accept the second side edge 4. Finally, an inner groove 24 may be formed in the inner edge 20 of the anvil 11 and adapted to receive the inner edge 7 of the slot 2 therein. The first anvil groove 22, the second anvil groove 23, and the inner anvil 24 may be formed to meet and form a continuous groove about the two side edges and the inner edge 18, 19 and 20 respectively. The anvil 11 may include a body 26 including a cable engaging face 27 facing away from the slot inner edge 7. A first flange 29 and a second flange 30 may be formed in the anvil 11 extending from the anvil body 26 parallel to the panel 1 in a direction away from the slot inner edge 7 and ending in a flange outer edge 31. The flanges 29 and 30 may each include an inner face 32, the faces 32 are spaced apart a fixed distance. The flanges 29 and 30 each include at least one cable engaging slot 33 formed therein extending from the flange outer edge 31 to at least the cable engaging face 27 of the anvil body 26. A plurality of the cable engaging slots 33 may be formed in corresponding pairs in the first flange 29 and the second flange 30 in alignment with each other. Each of the slots 33 may include a pair of parallel walls 34 spaced apart a fixed distance less than the diameter of the cables 14.

The clamping pad 12 in the present embodiment is of resilient construction and includes a body 36 including an inner side 37 facing the anvil 11. A groove 38 is formed in the pad inner side 37 parallel to the slot inner edge 7, bisecting the pad inner side 37 and forming a first and a second cable engaging face, 39 and 40 respectively. The body 36 of the pad 12 includes a first side surface 42 and a second side surface 43, both surfaces parallel to each other and spaced apart a fixed distance. The spacing of the first and second side surfaces 42 and 43 of the pad 12 are preferably less than the spacing of the inner surfaces 32 of the first and second flanges 29 and 30 of the anvil 11. A tongue 45 is formed on the body 36 of the pad 12 parallel to the slot inner edge 7 and extending in a direction away from the slot inner edge 7.

The latch member 16 includes a latch body 48 including a first side edge 49 and a second side edge 50. The first and second side edges 49 and 50 of the latch member 16 each include a corresponding groove, 51 and 52 respectively, formed parallel to and adapted to engage the side edges 3 and 4 of the slot 2. The latch member 16 may include an inner side 54 facing the clamping pad 12 and including a groove 55 formed therein parallel to the inner edge 7 of the slot 2 and sized to engage the tongue 45 of the pad 12. A first latch arm 58 and a second latch arm 59 extend from the latch body 48 of the latch member 16 adjacent to the first side edge 3 and the second side edge 4 of the slot 2 respectively in a direction away from the inner edge 7 of the slot 2, the latch arms 58 and 59 each including a distal end 60. A latch finger 62 extends from the distal end 60 of each of the latch arms 58 and 59 in a direction parallel to the inner edge 7 of the slot 2 and toward the respective corresponding slot side edge 3 or 4 a distance sufficient to engage the catch 9 of the corresponding side edge. A groove 64 is formed in each of the latch arms 58 and 59 extending from the latch fingers 62 in a direction towards the inner edge 7 of the slot 2. A pedestal 66 extends from the latch body 48 parallel to the panel 1, in a direction away from the inner edge 7 of the slot 2 and terminates in a platform 68. A tongue 70 extends parallel to the inner edge 7 of the slot 2 and in a direction away from same.

In operation, the anvil 11, preferably of resilient material in the present embodiment, is positioned with its first groove 22 and second groove 23 in alignment with the first side edge 3 and second side edge 4 of the slot 2 and the anvil slid into the slot 2 to the point where the inner groove 22 engages the inner edge 7 of the slot 2. The cables 14 are then pressed into the slots 33 of the anvil 11 to the point where the cables 14 contact the cable engaging face 27 thereby deforming the parallel faces 34 and forming a friction fit to grip the cables 14 therebetween.

The clamping pad 12 is then positioned with its first and second side surfaces 42 and 43 parallel to and within the inner surfaces 32 of the first and second flanges 29 and 30 of the anvil 11 and the pad is slid into position between the inner surfaces 32 of the flanges 29 and 30 with the cable engaging faces 39 and 40 in contact with the cables 14.

Finally, the latch member 16 is positioned with its first groove 51 and second groove 52 in alignment with the first side edge 3 and second side edge 4 of the slot 2 and force is applied to the latch member in a direction toward the slot 2.

As the latch member 16 engages the slot 2 via its first groove 51 and second groove 52 and is slid there along, the grooves 64 of the latch arms 58 and 59 will engage the side edges 3 and 4 of the slot 2. Continued force on the latch member 16 will cause the latch arms 58 and 59 to deflect in a direction towards each other and permit the latch fingers 62 to slide along the slot side edge 3 and 4 guided by the grooves 64 and engage the catches 9 thereby locking the latch member 16 within the slot 2.

As the latch member 16 moves into the final locked position the tongue 45 of the pad 12 will engage the inner groove 55 of the latch member 16 and the inner side 54 will come to bear against the body 36 of the pad 12 causing the pad 12 to be compressed against the cable 14 and the cable engaging faces 39 and 40 to deform about the cable 14. As force is applied on the cables 14 from the pad 12, the cables 14 will move in a direction towards the inner edge 7 of the slot 2 and cause the cable engaging face 27 of the anvil 11 to deform also about the cables 14 thereby clamping the cables between the pad 12 and the anvil 11.

The cable clamp of the present invention may be operated to release the clamped cables 14 by applying a compressive force to the distal ends 60 of the latch arms 58 and 59 in a direction to cause the arms to move towards each other. As the distal ends 60 move towards each other, the latch fingers 62 will move out of engagement with the catches 9 of the slot 2 thereby releasing the latch member 16 and permitting it to slide in a direction away from the inner edge 7 of the slot 2 and out of engagement with the slot. The pad 12 may then be slid out of engagement with the anvil flanges 29 and 30 and slot side edges 3 and 4. The cables 14 may then be pulled out of engagement with the slots 33 of the anvil 11 thereby freeing the cables. Finally, the anvil 11 may be slid out of engagement with the slot 2 thereby disassembling the the clamp of the present invention.

It will be appreciated that while the pad 12 and anvil 11 have been described composed of resilient material, that rigid material may alternatively be used in there construction. In this regard, when the cables 14 are clamped that deformation will take place in the cables and not in the anvil and head.

A second embodiment of the present invention may be realized by increasing the depth of the slot 2 to permit the insertion of multiple anvil 11 and pad 12 pairs. In this regard, the first anvil 11 may be positioned within the slot 2 and loaded with the cables 14. The first pad 12 may then be inserted into the slot 2. A second anvil 11 may then be slid into the slot 2 and loaded with the different ones the cables 14. A second pad 12 may then be inserted into the slot 2. Finally the lock member 16 may be loaded into the slot 2 to complete assembly of the present embodiment.

A third embodiment of the present invention may be realized by again increasing the depth of the slot 2, and additionally in this embodiment adding a second pair of the catches 9 at an appropriate deeper depth in the slot 2. Assembly of the clamp may be accomplished by assembly the various elements as described above for the first embodiment with the exception that the fingers 62 latch member 16 are engaged with the second pair of catches 9. Once the first cable clamp is assembled in the slot 2, the tongue 70 extending from the platform 68 of the first assembled cable clamp will act as an inner edge of the slot 2 thereby permitting a second clamp to be assembled in the slot 2 in the same manner as the first clamp.

A structural variation of the present invention may be realized by forming the pad 12 of the present invention integral with the latch member 16. In this regard, the groove 55 of the latch member 16, and the tongue 45 of the pad 12 would be omitted and the pad 12 would be formed joined and integral with the latch member 16 at the location of the omitted elements.

Another variation of the present invention may be realized by forming the anvil 11 of the present invention integral with the inner edge 7. In this regard, the inner edge 7 may be positioned to the location of the cable engaging surface 27 in an assembled cable clamp of the present invention and the flanges 29 and 30 may be formed integral with the planar surface on panel 1 extending in a direction towards the latch member 16. It will be appreciated that the variations of the present invention recited above may be combined in any combination with any of the recited embodiments.

A final variation of the present invention may be realized by attaching the planar surface to a rod to form a hanging cable clamp. Such a clamp would be useable to suspend a clamped cable from a supporting structure such a building ceiling or the under side of a roadway bridge. In operation, the end of the rod opposite the end attached to the planar surface would be attached to the supporting structure and the cable assembled within the cable clamp as previously described.

Although the preferred embodiments of the present invention have been illustrated and their forms described in detail, it will be readily apparent that to those skilled in the art that various modifications may be made therein without departing from the spirit of the invention or the scope of the appended claims.

What is claimed is:

1. A clamp for restraining thereat at least one cable passing through a planar surface near an edge thereof, said clamp comprising:

a slot extending inward of said planar surface from said planar surface edge, said slot including an inner edge and each of said first and said second parallel side edges orthogonal to said a slot inner edge;

at least one catch formed in each of said first and second slot side edges, said catches positioned opposite each other and at an identical fixed distance from said slot to said inner edge;

a clamping anvil positioned within said slot adjacent to said inner edge;

a clamping pad positioned within said slot adjacent to said anvil, said cable positioned between said pad and said anvil; and a latch member including
  a latch body positioned within said slot and against said clamping pad,
  a pair of latch arms each of flexible construction, extending from said latch body adjacent and parallel to a respective one of said slot side edges and in a direction away from said slot inner edge, each latch arm including a distal end,
  a latch finger extending from said latch arm distal end in a direction parallel to said slot inner edge and toward a respective one of said panel slot side edges, said fingers each engaging said respective panel slot side edge catches to lock said latch member within said slot and clamp said cable, and
  a groove formed in each of said latch arms extending from said latch arm finger a fixed distance in a direction towards said latch body, said latch arm grooves each engaging a corresponding one of said lot side edges to guide and maintain said latch fingers within said slot catches, said latch member engaging said slot to exert a force on said pad thus to clamp said cable between said pad and said anvil.

2. A clamp as claimed in claim 1, wherein: said anvil includes a body including a first groove formed in a first side edge thereof and engaging said slot first side edge, a second groove formed in a second side edge of said anvil body and engaging said slot second side edge and a third groove formed in an inner edge of said anvil body and engaging said slot inner edge to retain said anvil within said slot while permitting sliding movement thereof.

3. A clamp as claimed in claim 2, wherein: said first, second and third anvil grooves join to form a continuous groove about said anvil inner and both said side edges.

4. A clamp as claimed in claim 2, wherein: said pad includes a body including an inner side parallel to said slot inner edge and said anvil body includes a cable engaging face parallel to said slot inner edge, said pad inner side including a groove formed therein parallel to said slot inner edge, bisecting said inner side and forming a first and a second cable engaging face, said cable clamped between said first and second pad cable engaging surfaces and said anvil cable engaging face.

5. A clamp as claimed in claim 2, wherein: said pad includes a first and a second side surface, said side surfaces parallel to said planar surface and spaced apart at fixed distance, and said anvil includes a first and a second flange, said first and second anvil of flanges extending parallel to said panel in a direction away from said slot inner edge and each flange including an inner surface, said flange inner surfaces spaced apart a fixed distance to receive on a slideable basis, said pad first and second side surfaces therebetween.

6. A clamp as claimed in claim 5, wherein: said first and said second flanges each include at least one slot extending from an outer edge thereof inward to at least said anvil cable engaging face, said slots positioned within said flanges opposite and in alignment with each other and each slot including a pair of parallel walls spaced apart a predetermined distance less than a predetermined width of said cable.

7. A clamp as claimed in claim 6, wherein: said anvil is of resilient construction and deforms about said cable, to grip said cable when said cable is positioned within said flange slots prior to being clamped between said pad and said anvil.

8. A clamp as claimed in claim 6, wherein: said anvil is of rigid construction and said cable deforms and is gripped by said flange slots when positioned within said flange slots prior to being clamped between said pad and said anvil.

9. A clamp as claimed in claim 6, wherein: said pad and said anvil are of resilient construction and deform about said cable when said cable is positioned between said pad and anvil and clamped therebetween.

10. A clamp as claimed in claim 6, wherein: said pad and said anvil are of rigid construction and said cable deforms when positioned between said pad and anvil and clamped therebetween.

11. A clamp as claimed in claim 2, wherein: said latch body includes a first and a second side edge each including a groove formed therein, said latch edge grooves each engaged with a corresponding one of said slot side edges to retain said latch member within said slot while permitting sliding movement thereof.

12. A clamp as claimed in claim 11, wherein: said latch member includes a pedestal extending from said latch body in a direction away from said slot inner edge and a platform attached to a distal end of said pedestal, said platform engaging a second anvil of a second clamp within said panel slot to support same.

13. A clamp as claimed in claim 11, wherein: said latch body includes an inner side facing said slot inner edge and a groove formed therein parallel to said slot inner edge, and said pad includes a tongue formed parallel to said slot inner edge and extending from said pad in a direction away from said slot inner edge, said pad tongue engaged with said latch body inner edge groove to position said pad relative to said latch body.

* * * * *